US012791913B2

(12) United States Patent
Shu

(10) Patent No.: US 12,791,913 B2
(45) Date of Patent: Nov. 10, 2026

(54) LIGHTING APPARATUS CAPABLE OF SWITCHING FLASH MODES OF LIGHTING APPARATUS BY SIMPLE OPERATION WITH RESPECT TO IMAGE PICKUP APPARATUS, CONTROL METHOD FOR LIGHTING APPARATUS, STORAGE MEDIUM, AND IMAGE PICKUP SYSTEM

(71) Applicant: CANON KABUSHIKI KAISHA, Tokyo (JP)

(72) Inventor: Takayuki Shu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 115 days.

(21) Appl. No.: 18/999,005

(22) Filed: Dec. 23, 2024

(65) Prior Publication Data

US 2025/0244638 A1 Jul. 31, 2025

(30) Foreign Application Priority Data

Jan. 26, 2024 (JP) ................................ 2024-010126

(51) Int. Cl.

*G03B 7/17* (2021.01)
*G03B 15/05* (2021.01)
*H04N 23/74* (2023.01)

(52) U.S. Cl.

CPC ............... *G03B 7/17* (2015.01); *G03B 15/05* (2013.01); *H04N 23/74* (2023.01)

(58) Field of Classification Search

CPC ........... G03B 15/05; G03B 7/17; H04N 23/74
See application file for complete search history.

(56) References Cited

U.S. PATENT DOCUMENTS

| | | | | |
|---|---|---|---|---|
| 11,696,019 B2 * | 7/2023 | Miyazaki | ............. | H04N 23/531 348/333.02 |
| 2019/0394381 A1 * | 12/2019 | Gouji | ..................... | H04N 23/72 |
| 2020/0195821 A1 * | 6/2020 | Miyazaki | ............... | H04N 23/74 |
| 2022/0345639 A1 * | 10/2022 | Miyazaki | ............. | H04N 23/531 |

FOREIGN PATENT DOCUMENTS

| | | |
|---|---|---|
| JP | 2022167259 A | 11/2022 |

* cited by examiner

*Primary Examiner* — Antoinette T Spinks
(74) *Attorney, Agent, or Firm* — Cowan, Liebowitz & Latman, P.C.

(57) ABSTRACT

A lighting apparatus includes a light emitting unit, a communication unit that performs communication with an image pickup apparatus, a first setting unit that sets a flash mode of the light emitting unit to a first flash mode that causes the light emitting unit to emit light with a flash amount set manually or a second flash mode that causes the light emitting unit to emit light with a flash amount determined by automatic light control, and a control unit that, in a case of receiving a command to switch the flash mode of the light emitting unit from the image pickup apparatus via the communication unit, at a time point of receiving the command, performs switching to the second flash mode when the first flash mode has been set and performs switching to the first flash mode when the second flash mode has been set.

11 Claims, 7 Drawing Sheets

LIGHTING APPARATUS CAPABLE OF SWITCHING FLASH MODES OF LIGHTING APPARATUS BY SIMPLE OPERATION WITH RESPECT TO IMAGE PICKUP APPARATUS, CONTROL METHOD FOR LIGHTING APPARATUS, STORAGE MEDIUM, AND IMAGE PICKUP SYSTEM

BACKGROUND

Technical Field

The aspect of the embodiments relates to a lighting apparatus, a control method for the lighting apparatus, a storage medium, and an image pickup system.

Description of the Related Art

An image pickup system, in which, in the case that a lighting apparatus (a so-called strobe device) has been attached to an image pickup apparatus, a flash mode and the like of the lighting apparatus are capable of being set from the image pickup apparatus, has been known (for example, see Japanese Laid-Open Patent Publication (kokai) No. 2022-167259).

The technique disclosed in Japanese Laid-Open Patent Publication (kokai) No. 2022-167259 requires complicated operations such as causing a display unit of the image pickup apparatus to display a screen for setting flash conditions, operating an operation unit of the image pickup apparatus to move a cursor on the screen to a desired item field, and pressing a set button on the operation unit.

SUMMARY

A first aspect of the embodiments provides a lighting apparatus comprising a light emitting unit, at least one processor, and a memory coupled to the processor storing instructions that, when executed by the processor, cause the processor to function as a communication unit that performs communication with an image pickup apparatus, a first setting unit that sets a flash mode of the light emitting unit to a first flash mode that causes the light emitting unit to emit light with a flash amount set manually or a second flash mode that causes the light emitting unit to emit light with a flash amount determined by automatic light control, and a control unit that, in a case of receiving a command to switch the flash mode of the light emitting unit from the image pickup apparatus via the communication unit, at a time point of receiving the command, performs switching to the second flash mode when the first flash mode has been set and performs switching to the first flash mode when the second flash mode has been set.

A second aspect of the embodiments provides an image pickup system, in which a lighting apparatus and an image pickup apparatus are communicably connected to each other. The image pickup apparatus comprises at least one processor, and a memory coupled to the processor storing instructions that, when executed by the processor, cause the processor to function as a generating unit that generates a command to switch a flash mode of the lighting apparatus in response to one operation. The lighting apparatus comprises a light emitting unit, at least one processor, and a memory coupled to the processor storing instructions that, when executed by the processor, cause the processor to function as a first setting unit that sets the flash mode of the lighting apparatus to a first flash mode that causes the light emitting unit to emit light with a flash amount set manually or a second flash mode that causes the light emitting unit to emit light with a flash amount determined by automatic light control, and a first control unit that, in a case of receiving the command from the image pickup apparatus by communication, at a time point of receiving the command, performs switching to the second flash mode when the first flash mode has been set and performs switching to the first flash mode when the second flash mode has been set.

Further features of the disclosure will become apparent from the following description of exemplary embodiments with reference to the attached drawings.

DESCRIPTION OF THE EMBODIMENTS

Hereinafter, embodiments will be described in detail with reference to the attached drawings.

Hereinafter, an embodiment of the disclosure will be described in detail with reference to the attached drawings. Here, as a lighting apparatus according to the disclosure, a strobe device capable of being attached or detached as an accessory to or from an image pickup apparatus such as a digital camera will be taken up. In addition, in the following description, the image pickup apparatus refers to a main body of the image pickup apparatus that includes an image pickup device. However, for the sake of convenience, an image pickup apparatus in which a photographing lens is integrally configured with the main body of the image pickup apparatus, such as a compact digital camera, is considered to be included in the image pickup apparatus. For an image pickup apparatus such as a single-lens reflex camera or a mirrorless single-lens camera that allows accessories such as a lens barrel (an interchangeable lens) and a lighting apparatus to be attached or detached to or from the main body of the image pickup apparatus, a configuration in which various kinds of accessories have been attached to the image pickup apparatus is referred to as “an image pickup system”.

Figure 1:
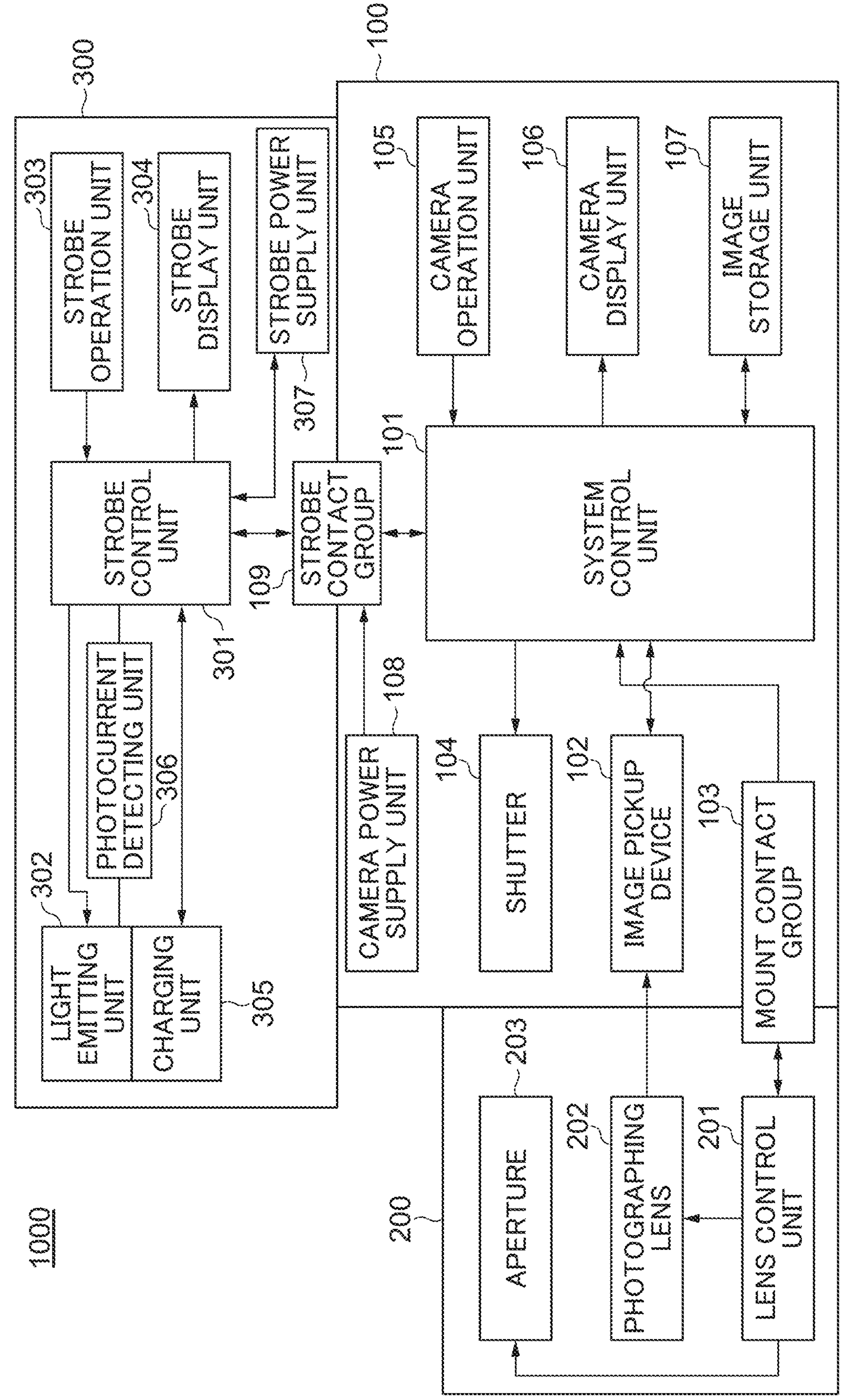
FIG. 1 is a block diagram that shows a schematic configuration of an image pickup system according to an embodiment.

FIG. 1 is a block diagram that shows a schematic configuration of an image pickup system 1000 according to the embodiment. The image pickup system 1000 is configured by attaching (mounting) a lens barrel 200 and a strobe device 300 to (on) a digital camera 100, which is an example of the image pickup apparatus (hereinafter, simply referred to as “a camera 100”).

The camera 100 includes a system control unit 101, an image pickup device 102, a shutter 104, a camera operation unit 105, a camera display unit 106, an image storage unit 107, and a camera power supply unit 108. The lens barrel 200 includes a lens control unit 201, a photographing lens 202, and an aperture 203. The strobe device 300 includes a strobe control unit 301, a light emitting unit 302, a strobe operation unit 303, a strobe display unit 304, a charging unit 305, a photocurrent detecting unit 306, and a strobe power supply unit 307.

When the lens barrel 200 is attached to the camera 100, a group of contacts (a contact group) on the lens barrel 200 and a group of contacts (a contact group) provided near a lens mount of the camera 100 are electrically and mechanically connected to form a mount contact group (a group of mount contacts) 103. As a result, the system control unit 101 and the lens control unit 201 are connected so as to be able to communicate with each other. When the strobe device 300 is attached to the camera 100, a group of contacts (a contact group) on the strobe device 300 and a group of contacts (a contact group) provided on an accessory shoe of the camera 100 are electrically and mechanically connected to form a strobe contact group (a group of strobe contacts) 109. As a result, the system control unit 101 and the strobe control unit 301 are connected so as to be able to communicate with each other.

In the camera 100, the system control unit 101 is a microcomputer that comprehensively controls the operations of the respective units of the camera 100, and also controls the overall operation of the image pickup system 1000. In addition, the system control unit 101 performs predetermined image processing with respect to image signals transmitted from the image pickup device 102 to generate image data. The image pickup device 102 converts an optical image formed by the lens barrel 200 into electrical signals to generate the image signals, and outputs the image signals to the system control unit 101. The shutter 104 is, for example, a focal plane shutter configured with a front curtain and a rear curtain, and is disposed between the image pickup device 102 and the lens barrel 200. The shutter 104 operates in response to instructions from the system control unit 101.

The camera operation unit 105 includes buttons, switches, a dial, a touch panel, and the like that are operated by a user, and transmits signals in accordance with operations performed by the user to the system control unit 101. In the present embodiment, it is assumed that the camera operation unit 105 includes at least one button to which a function is capable of being assigned by the user (hereinafter, referred to as “an assignment button”). In addition, in the present embodiment, it is assumed that a function of switching flash modes of the strobe device 300 has been set in advance by the user to one assignment button. That is, when the assignment button is press-operated, the system control unit 101 generates a command to switch the flash modes (a flash mode switching command).

The camera display unit 106 includes, for example, a liquid crystal panel, etc., and displays a menu screen for performing various kinds of settings not only of the camera 100 but also of the image pickup system 1000, photographing information, a live view video image, a photographed image, etc., in accordance with the control by the system control unit 101. The image storage unit 107 is a storage medium that stores photographed image data, and is, for example, a memory card or the like that is attachable or detachable to or from the camera 100. The camera power supply unit 108 is a battery, an AC adapter, or the like, and supplies power to the camera 100 and the lens barrel 200. It should be noted that the camera power supply unit 108 includes an accessory power supply circuit 110 (see FIG. 2) that supplies, to the strobe device 300, a voltage for detecting the attachment of the strobe device 300 to the camera 100.

In the lens barrel 200, the lens control unit 201 is a microcomputer that controls the operations of the respective units of the lens barrel 200 in accordance with commands from the system control unit 101. The photographing lens 202 is configured by a plurality of lenses, such as a focus lens, a zoom lens, and an image stabilization lens, and forms an optical image of a subject on the image pickup device 102. The aperture 203 adjusts the amount of light passing through the photographing lens 202.

In the strobe device 300, the strobe control unit 301 is a microcomputer that controls the operations of the respective units of the strobe device 300 in accordance with commands from the system control unit 101. The light emitting unit 302 includes a discharge tube, a light emitting circuit, and a light emitting optical system, and drives the light emitting circuit in response to an instruction from the strobe control unit 301, causes the discharge tube to emit light by using the energy (electric charge) stored in a capacitor of the charging unit 305, and irradiates the subject with a flash of light via the light emitting optical system.

The charging unit 305 includes the capacitor that accumulates the electric charge for causing the discharge tube of the light emitting unit 302 to emit light, and a charging circuit that charges the capacitor from the strobe power supply unit 307. It should be noted that the strobe control unit 301 detects the voltage charged to the capacitor, and controls a charging operation with respect to the capacitor so that the charging operation is stopped when the charging voltage becomes equal to or higher than a predetermined threshold value, and the charging operation is started when the charging voltage of the capacitor becomes lower than the predetermined threshold value. The strobe control unit 301 transmits, to the system control unit 101, the charging voltage of the capacitor and information indicating the completion of charging.

The strobe operation unit 303 includes buttons, switches, a dial, and the like that are operated by the user, and transmits signals in accordance with operations performed by the user to the strobe control unit 301. The strobe display unit 304 includes, for example, a liquid crystal panel, etc., and displays various kinds of settings of the strobe device 300 including the flash modes, etc., in accordance with the control by the strobe control unit 301.

It should be noted that the flash modes of the strobe device 300 include at least a manual flash mode (a first flash mode), an automatic light control mode (a second flash mode), a multiple flash mode (a third flash mode), and the like. The manual flash mode is a mode in which the user is able to manually and freely determine the amount of flash light (a flash amount). The automatic light control mode is a mode in which a pre-flash is performed, a flash amount during main photographing (a main flash amount) is calculated based on the result of the reflected light from the subject received by the image pickup device 102, and the main photographing (actual photographing) is performed with the obtained main flash amount, thereby achieving photographing with appropriate exposure. The multiple flash mode is a mode in which a flash of light is emitted multiple times in succession while the shutter curtain is open. The flash mode setting in the strobe device 300 is performed by the user operating the strobe operation unit 303, but is not limited to this and may be performed by communicating (transmitting)

operation information of the camera operation unit 105 by the user to the strobe device 300.

The photocurrent detecting unit 306 includes a light receiving diode and a circuit that integrates the current generated by the light receiving diode and converts it into a voltage, detects the amount of light emitted by the light emitting unit 302, and transmits, to the strobe control unit 301, the detected amount of light emitted (the detected flash amount). The strobe control unit 301 determines whether or not a predetermined flash amount has been irradiated by comparing the photocurrent or the integrated voltage of the photocurrent with a predetermined threshold value, and stops the emission of light from the light emitting unit 302 when the predetermined flash amount is detected. The strobe power supply unit 307 includes a battery and an electric circuit for supplying power from the battery to the respective units of the strobe device 300.

Figure 2:
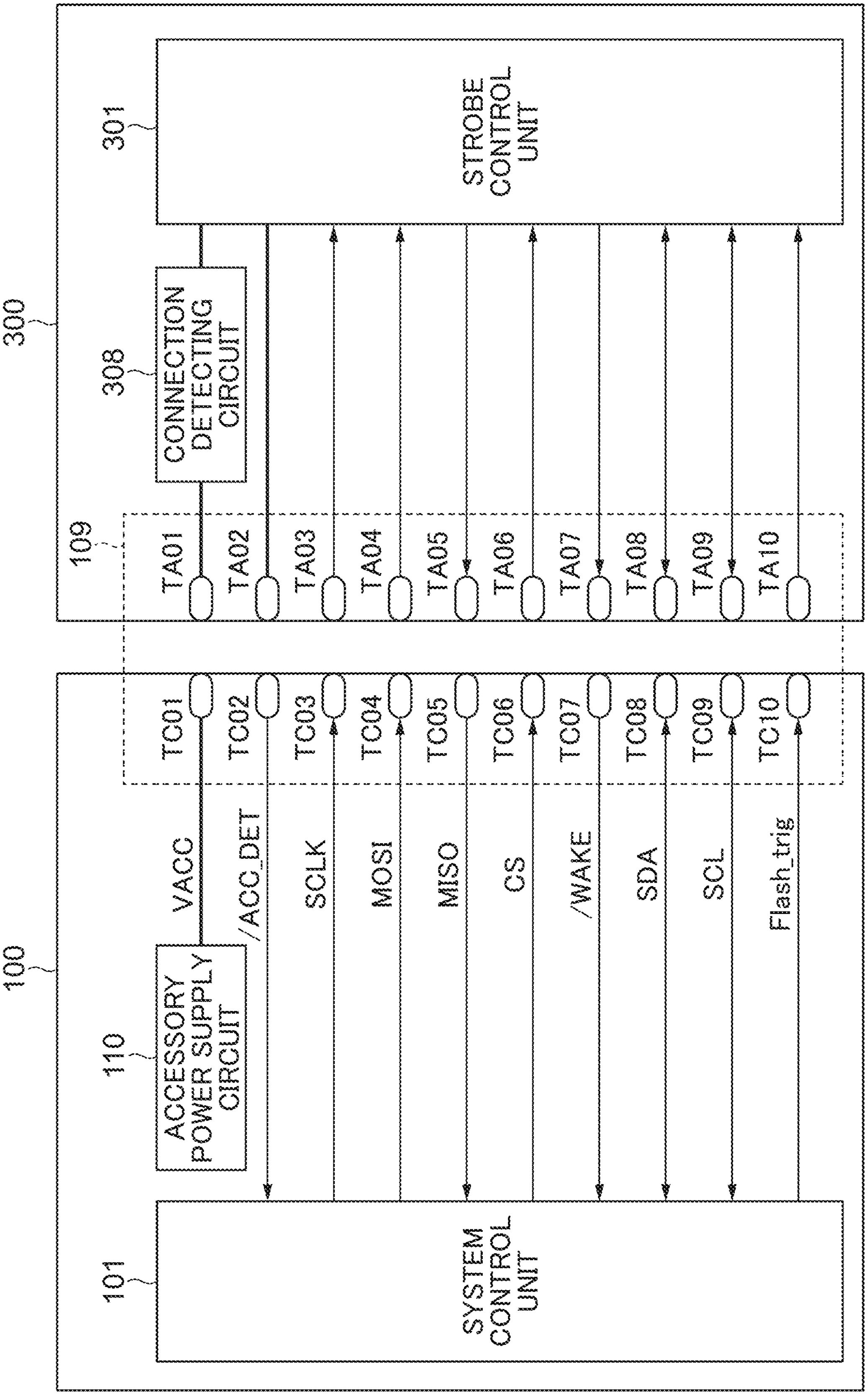
FIG. 2 is a diagram that shows a configuration of a strobe contact group.

FIG. 2 is a diagram that shows a configuration of the strobe contact group 109. The camera 100 and the strobe device 300 are electrically connected by one-to-one contact between a plurality of contacts (terminals) TC01 to TC10 of the contact group provided on the accessory shoe of the camera 100 and a plurality of contacts TA01 to TA10 provided on the strobe device 300.

The accessory power supply circuit 110 included in the camera power supply unit 108 generates an accessory power supply VACC, and the accessory power supply VACC is supplied to the strobe device 300 via the contact TC01 and the contact TA01. The accessory power supply VACC is connected to a connection detecting circuit 308 disposed in the strobe device 300. When the accessory power supply VACC exceeds a predetermined voltage level, the connection detecting circuit 308 determines that the strobe device 300 has been attached to the camera 100, and notifies the strobe control unit 301 of the result. It should be noted that the accessory power supply VACC is used only to detect whether the strobe device 300 has been attached to or detached from the camera 100, and the power supplied from the strobe power supply unit 307 is used for various kinds of operations of the strobe device 300.

The contact TC02 and the contact TA02 are used to transmit an accessory attachment detection signal/ACC_DET, and the system control unit 101 is able to detect whether or not the strobe device 300 has been attached by reading out the signal level of the accessory attachment detection signal/ACC_DET. For example, if the signal level (the electric potential) of the accessory attachment detection signal/ACC_DET is the Hi level, the strobe device 300 is in an unattached state, and if the signal level (the electric potential) of the accessory attachment detection signal/ACC_DET is the Lo level, the strobe device 300 is in an attached state. The signal level of the contact TA02 is controlled by the strobe control unit 301. The strobe control unit 301 sets the signal level of the accessory attachment detection signal/ACC_DET to the Lo level according to a predetermined condition, such as a power switch of the strobe device 300 being turned on, and notifies the system control unit 101 that the strobe device 300 has been connected.

The system control unit 101 serves as a communication master and performs serial peripheral interface communication (SPI communication) with the strobe control unit 301. For this reason, the contact TC03 and the contact TA03 are used to transmit an SCLK signal, the contact TC04 and the contact TA04 are used to transmit an MOSI signal, the contact TC05 and the contact TA05 are used to transmit an MISO signal, and the contact TC06 and the contact TA06 are used to transmit a CS signal.

The contact TC07 and the contact TA07 are used to transmit a communication request signal/WAKE from the strobe control unit 301 to the system control unit 101. The system control unit 101 receives a communication request from the strobe control unit 301 by detecting the falling edge of the communication request signal/WAKE. The signal level of the contact TA07 is controlled by the strobe control unit 301, and in the case that the strobe control unit 301 determines that communication with the camera 100 is necessary, the strobe control unit 301 makes a communication request to the system control unit 101 by setting the communication request signal/WAKE to the Lo level.

The system control unit 101 serves as a communication master and performs inter-integrated circuit communication (I2C communication). For this reason, the contact TC08 and the contact TA08 are used to transmit an SDA signal, and the contact TC09 and the contact TA09 are used to transmit an SCL signal. The contact TC10 and the contact TA10 are used to transmit a Flash_trig signal, which is a signal by which the system control unit 101 notifies the strobe control unit 301 of a flash timing.

Figure 3:
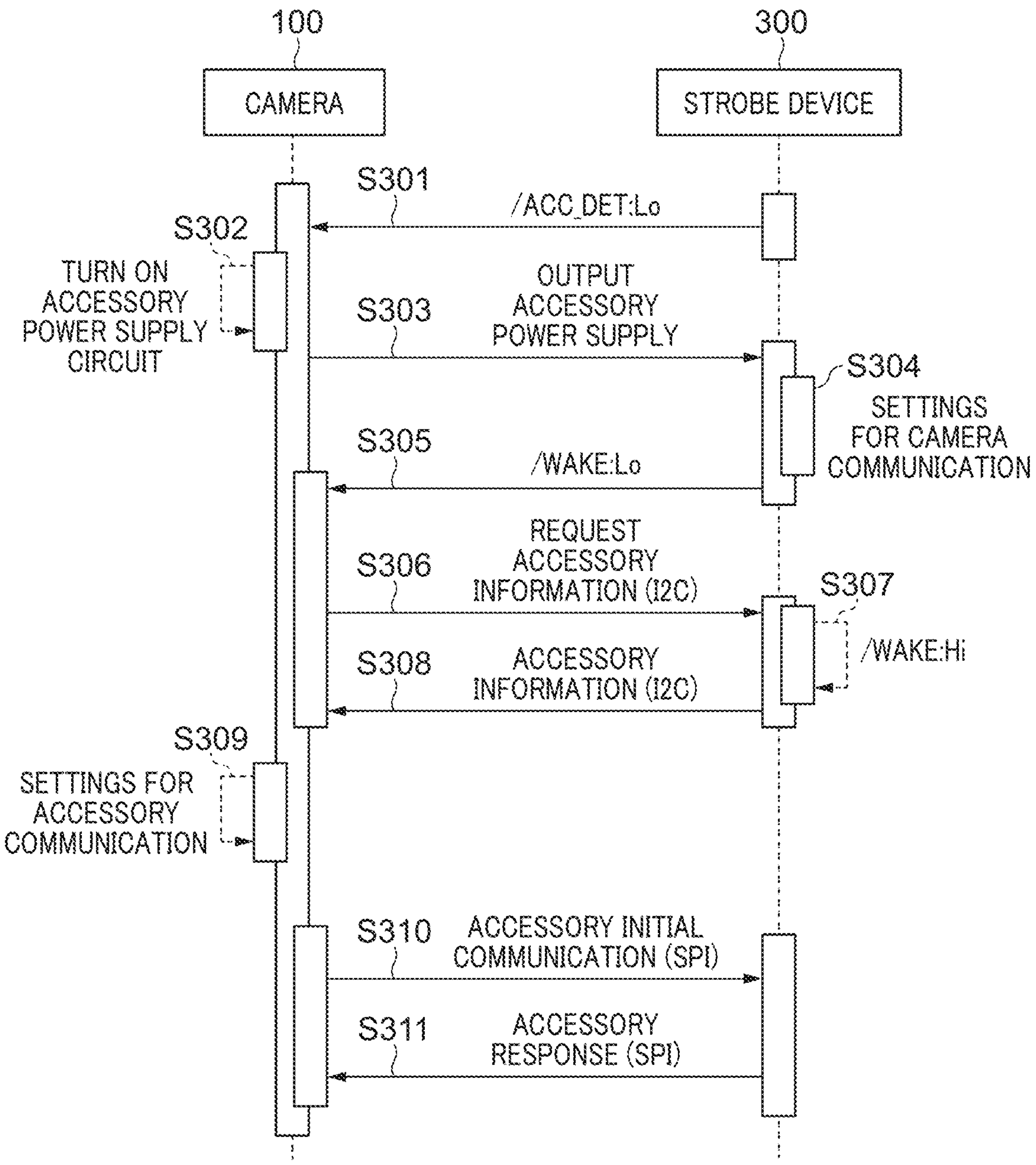
FIG. 3 is a sequence diagram that illustrates a processing for establishing communication between an image pickup apparatus and a strobe device.

FIG. 3 is a sequence diagram that illustrates a processing executed to establish communication between the camera 100 and the strobe device 300 when the strobe device 300 has been attached to the camera 100. Here, it is assumed that the strobe control unit 301 has normally completed the initialization of the strobe device 300 which is performed after the power of the strobe device 300 is turned on.

In S301, the strobe control unit 301 sets the signal level of the accessory attachment detection signal/ACC_DET of the contact TA02 to the Lo level.

In S302, the system control unit 101 detects that the accessory attachment detection signal/ACC_DET has reached the Lo level, thereby determining that an accessory has been attached, and turns on the power supply of the accessory power supply circuit 110.

As a result, in S303, the accessory power supply circuit 110 outputs the accessory power supply VACC. When the connection detecting circuit 308 detects that the accessory power supply VACC has exceeded the predetermined voltage level, in S304, the strobe control unit 301 determines that the strobe device 300 has been attached to the camera 100 and performs various settings for performing communication with the camera 100. In S305, the strobe control unit 301 sets the signal level of the communication request signal/WAKE to the Lo level.

When the system control unit 101 detects that the communication request signal/WAKE has reached the Lo level, the system control unit 101 determines that communication with the strobe control unit 301 has become possible, and in S306, requests the strobe control unit 301 to transmit accessory information via I2C communication. When the strobe control unit 301 receives the I2C communication, the strobe control unit 301 sets the communication request signal/WAKE to the Hi level in S307, and further transmits the accessory information to the system control unit 101 in S308. It should be noted that the accessory information includes information indicating that the accessory attached to the camera 100 is a strobe device (a lighting apparatus), etc.

When the system control unit 101 receives the accessory information, the system control unit 101 performs various communication settings for the camera 100 in S309. Thereafter, the system control unit 101 performs initial communication with the strobe control unit 301 by SPI communication in S310, and the strobe control unit 301 responds to the system control unit 101 with respect to the initial communication by SPI communication in S311. In this way, the communication between the camera 100 and the strobe device 300 is established.

Figure 4:
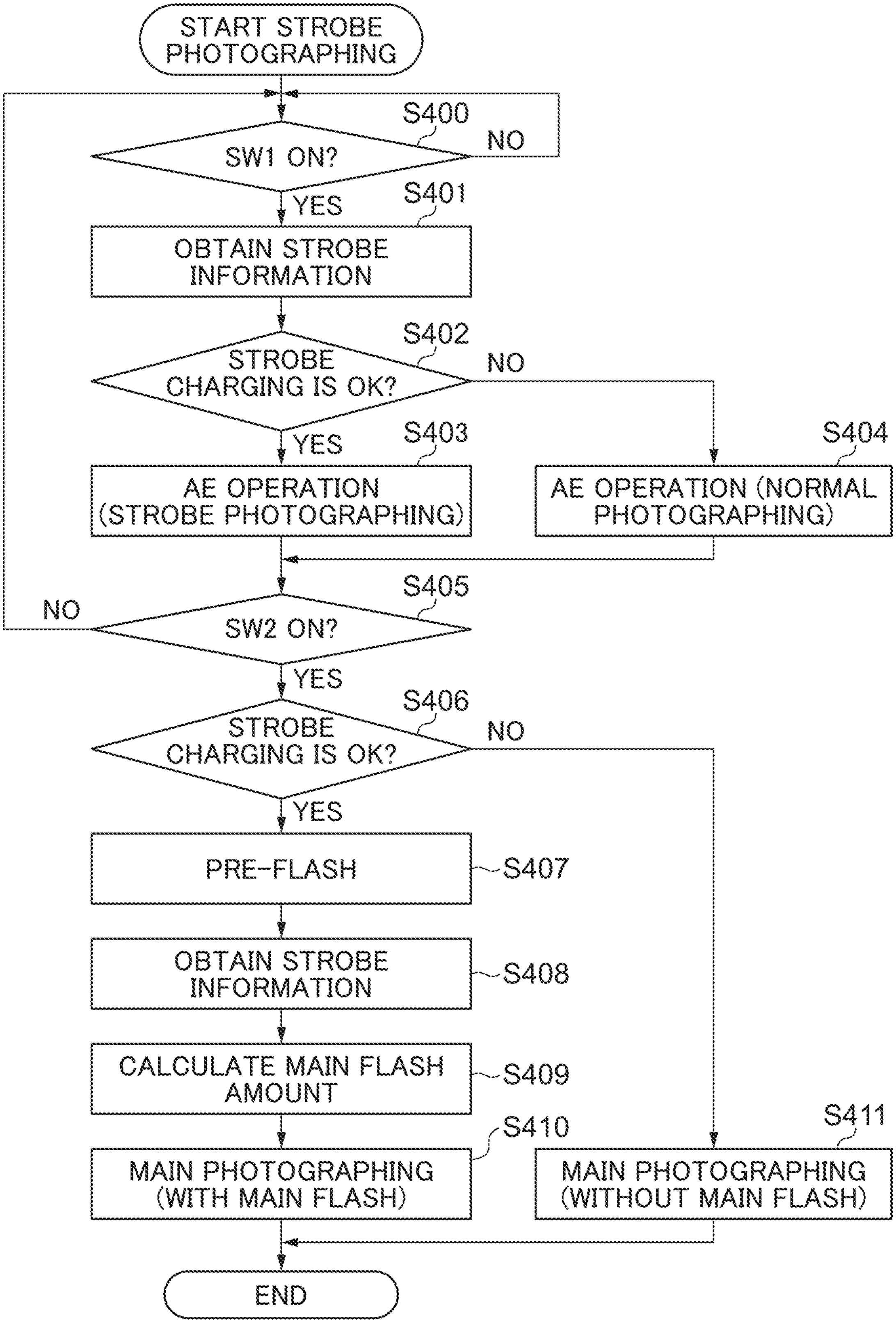
FIG. 4 is a flowchart of a strobe automatic light control photographing processing performed by the image pickup system.

FIG. 4 is a flowchart of a strobe automatic light control photographing processing performed by the image pickup system 1000. Respective processes (respective steps) indicated by S numbers in the flowchart of FIG. 4 are realized by the system control unit 101 executing a predetermined program and cooperating with the lens control unit 201 and the strobe control unit 301 to comprehensively control the image pickup system 1000. It should be noted that the flowchart of FIG. 4 illustrates the processing for performing still image photographing one time. In addition, it is assumed here that the strobe device 300 has been set to the automatic light control mode.

In S400, the system control unit 101 determines whether or not an SW1 signal has been turned on. In the case that the system control unit 101 determines that the SW1 signal has been turned on (YES in S400), the system control unit 101 executes the process of S401, and in the case that the system control unit 101 determines that the SW1 signal remains being turned off (NO in S400), the system control unit 101 continues to execute the process of S400.

It should be noted that the SW1 signal is a signal generated by a half-press operation (the first stage operation) of a shutter button belonging to the camera operation unit 105 of the camera 100. When the system control unit 101 detects the SW1 signal, the system control unit 101 drives the image pickup device 102 to perform the image pickup, repeats photometry control (an AE operation) to measure the luminance of the subject from the result of the image pickup, and determines exposure control values (a shutter speed, an aperture value, an ISO sensitivity, etc.) to be used during photographing from the photometry result. The determined exposure control values are displayed on the camera display unit 106.

In S401, the system control unit 101 obtains strobe information from the strobe control unit 301. The strobe information includes information on the flash mode in which the strobe device 300 has been set, information indicating the charging state, etc.

In S402, the system control unit 101 determines whether or not the charging state of the strobe device 300 is a light emittable state (whether or not charging is OK) based on the strobe information obtained in S401. In the case that the system control unit 101 determines that charging is OK (YES in S402), the system control unit 101 executes the process of S403. On the other hand, in the case that the system control unit 101 determines that charging is not OK (charging is NG) (NO in S402), the system control unit 101 executes the process of S404.

In S403, the system control unit 101 performs an AE operation for strobe photographing that is accompanied with a flash operation performed by the strobe device 300, and then executes the process of S405. In addition, in S404, the system control unit 101 performs an AE operation for normal photographing that is not accompanied with a flash operation performed by the strobe device 300, and then executes the process of S405. It should be noted that the AE operation refers to a processing of calculating the luminance of the subject area from the signals obtained from the image pickup device 102 and determining the exposure control values at the time of photographing. For example, in S403, taking into consideration the possibility of a loss of highlight detail in the photographed image (the possibility of saturation of the image pickup device 102) due to the light emitted from the strobe device 300, the upper limit value of the ISO sensitivity is set lower than the ISO sensitivity determined in S404.

In S405, the system control unit 101 determines whether or not an SW2 signal has been turned on. In the case that the system control unit 101 determines that the SW2 signal has been turned on (YES in S405), the system control unit 101 executes the process of S406, and in the case that the system control unit 101 determines that the SW2 signal has not been turned on (NO in S405), the system control unit 101 executes the process of S400. It should be noted that the SW2 signal is a signal generated by a full-press operation (the second stage operation) of the shutter button belonging to the camera operation unit 105 of the camera 100.

In S406, the system control unit 101 communicates with the strobe control unit 301 and determines whether or not the charging state of the strobe device 300 is the light emittable state (whether or not charging is OK). In the case that the system control unit 101 determines that charging is OK (YES in S406), the system control unit 101 executes the process of S407. On the other hand, in the case that the system control unit 101 determines that charging is not OK (charging is NG) (NO in S406), the system control unit 101 executes the process of S411. It should be noted that, in the case that "charging is OK", the energy required for a pre-flash in S407 and a main flash in S410 has been charged, and the pre-flash amount and the main flash amount have been designed not to become smaller than a flash amount threshold value described below.

In S407, the system control unit 101 performs pre-flash control with respect to the strobe device 300. It should be noted that the control of the pre-flash executed by the strobe device 300 will be described below.

In S408, the system control unit 101 obtains strobe information during and after the pre-flash from the strobe control unit 301.

In S409, the system control unit 101 calculates a strobe flash amount at the time of the main photographing (the main flash amount) based on the pre-flash processing in S407 and the strobe information obtained in S408.

In S410, the system control unit 101 executes main photographing (actual photographing) that is accompanied with a flash operation performed by the strobe device 300, and then the strobe automatic light control photographing processing ends. In the main photographing (the actual photographing) referred to here, the strobe device 300 executes the main flash and at the same time the image pickup device 102 is exposed with the exposure control values that have been set, and the predetermined image processing is performed with respect to the image signals outputted from the image pickup device 102 to generate image data. The generated image data is stored in the image storage unit 107, and a reduced image of the generated image data is displayed on the camera display unit 106.

In S411, the system control unit 101 executes main photographing (actual photographing) that is not accompanied with a flash operation performed by the strobe device 300, and then the strobe automatic light control photographing processing ends. In the main photographing (the actual photographing) referred to here, the same operations as in S410 are executed, except that the strobe device 300 is not caused to emit light (the strobe device 300 is not caused to perform a flash operation).

Figure 5A:
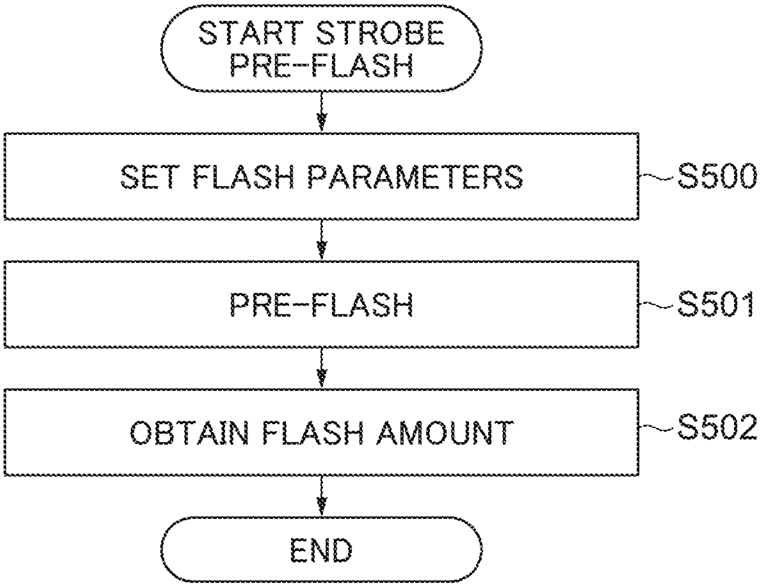
FIG. 5A is a flowchart of a pre-flash operation executed in S407.

FIG. 5A is a flowchart of a pre-flash operation executed by the strobe device 300 in S407. When the strobe control unit 301 receives a pre-flash control command from the system control unit 101 via the strobe contact group 109, the strobe control unit 301 starts the process of S500.

In S500, the strobe control unit 301 sets parameters for performing the pre-flash in accordance with the pre-flash control command received from the system control unit 101.

In S501, the strobe control unit 301 controls the light emitting unit 302 with the parameters that have been set in S500 to execute the pre-flash. At this time, the strobe control unit 301 uses information obtained from the photocurrent detecting unit 306 to perform the control so that an appropriate amount of light is irradiated onto the subject. In addition, the system control unit 101 and the strobe control unit 301 perform timing control via the strobe contact group 109 to synchronize the strobe flash with the exposure timing of the image pickup device 102.

In S502, the strobe control unit 301 obtains information about an actual flash amount in the pre-flash executed in S501, and then ends the pre-flash operation. The information about the actual flash amount referred to here is a voltage value obtained by integrating a photocurrent detected by the photocurrent detecting unit 306 at the time of the pre-flash. When the pre-flash operation ends, the system control unit 101 executes the process of S408.

Figure 5B:
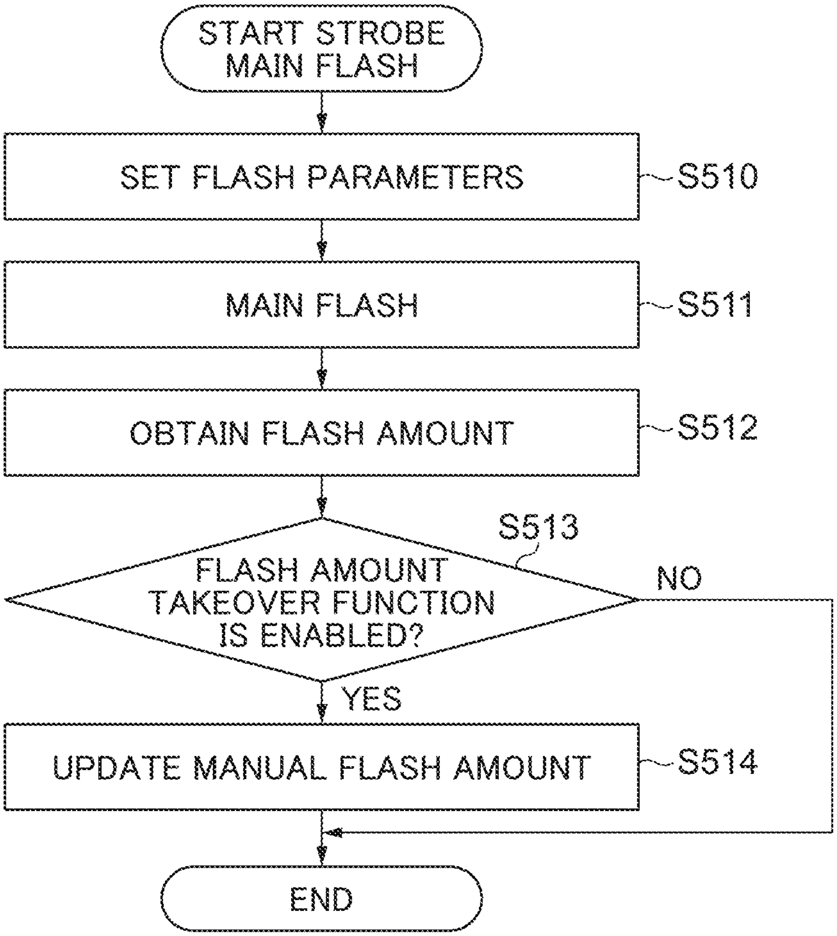
FIG. 5B is a flowchart of a main flash operation executed in S410.

FIG. 5B is a flowchart of a main flash operation executed in the main photographing of S410. When the strobe control unit 301 receives a main flash control command from the system control unit 101 via the strobe contact group 109, the strobe control unit 301 starts the process of S510.

In S510, the strobe control unit 301 sets parameters for performing the main flash based on the pre-flash information that has been retained by the strobe control unit 301 in accordance with the main flash control command received from the system control unit 101.

In S511, the strobe control unit 301 controls the light emitting unit 302 with the parameters that have been set in S510 to execute the main flash. At this time, the strobe control unit 301 uses information obtained from the photocurrent detecting unit 306 to perform the control so that an appropriate amount of light is irradiated onto the subject. In addition, the system control unit 101 and the strobe control unit 301 perform timing control via the strobe contact group 109 to synchronize the strobe flash with the exposure timing of the image pickup device 102.

In S512, the strobe control unit 301 obtains information about an actual flash amount in the main flash executed in S511. The information about the actual flash amount referred to here is a voltage value obtained by integrating a photocurrent detected by the photocurrent detecting unit 306 at the time of the main flash.

In S513, the strobe control unit 301 determines whether or not a flash amount takeover function is enabled (is turned on). In the case that the strobe control unit 301 determines that the flash amount takeover function is enabled (YES in S513), the strobe control unit 301 executes the process of S514. On the other hand, in the case that the strobe control unit 301 determines that the flash amount takeover function is disabled (is turned off) (NO in S513), the strobe control unit 301 ends the main flash operation.

Here, the flash amount takeover function and the setting method thereof will be described. The flash amount takeover function is a function that stores the flash amount at the time of the main flash in the automatic light control mode, and when switching from the automatic light control mode to the manual flash mode, automatically sets the flash amount in the manual flash mode to the stored flash amount. Enabling (turning on) or disabling (turning off) the flash amount takeover function is performed by a predetermined operation on the strobe operation unit 303 performed by the user. However, the disclosure is not limited to this, and it may be determined by the operation information of the camera operation unit 105 by the user being notified to the strobe device 300.

In S514, the strobe control unit 301 updates the stored setting value of the flash amount in the manual flash mode with the value of the most recent main flash amount in the automatic light control mode based on the flash amount information obtained in S512, and then ends the main flash operation. For example, in the case that the integrated voltage obtained at the time of the main flash in the automatic light control mode is about ¼ of the integrated voltage when 1/1 flash (full flash) is performed, the main flash amount in the automatic light control mode is determined to be ¼ flash, and the setting value of the manual flash amount is updated to ¼.

In addition, the strobe operation unit 303 of the strobe device 300 is provided with a flash mode switching button that alternately switches between the automatic light control mode and the manual flash mode by one pressing operation in the case that the flash amount takeover function is enabled. When switching from the automatic light control mode to the manual flash mode is performed by pressing the flash mode switching button, if the flash amount takeover function is enabled, the flash amount determined in the automatic light control mode will be taken over to the flash amount in the manual flash mode. As a result, the most recent flash amount determined in the automatic light control mode has been set to an initial flash amount in the manual flash mode, so the user is able to fine-tune the flash amount from the already-set flash amount to suit intention of photographing. This makes it possible to simplify the preliminary preparations for manual flash photographing.

It should be noted that in the strobe device 300, in the case that the flash amount takeover function is disabled, even if the flash mode switching button of the strobe operation unit 303 is pressed, the switching of the flash mode will not be performed. Therefore, when switching from the automatic light control mode to the manual flash mode, it is necessary to operate a plurality of operation members of the strobe operation unit 303 or a plurality of operation members of the camera operation unit 105 to set the flash amount.

In the image pickup system 1000, regardless of whether the flash amount takeover function in the strobe device 300 is enabled or disabled, it is possible to set a function to switch between the automatic light control mode and the manual flash mode by one pressing operation of the assignment button on the camera 100. In other words, when the assignment button for which the flash mode switching has been set is pressed, the system control unit 101 generates a flash mode switching command and transmits it to the strobe control unit 301. When the strobe control unit 301 receives the flash mode switching command from the system control unit 101, the strobe control unit 301 switches between the automatic light control mode and the manual flash mode regardless of whether the flash amount takeover function is enabled or disabled.

Figure 6:
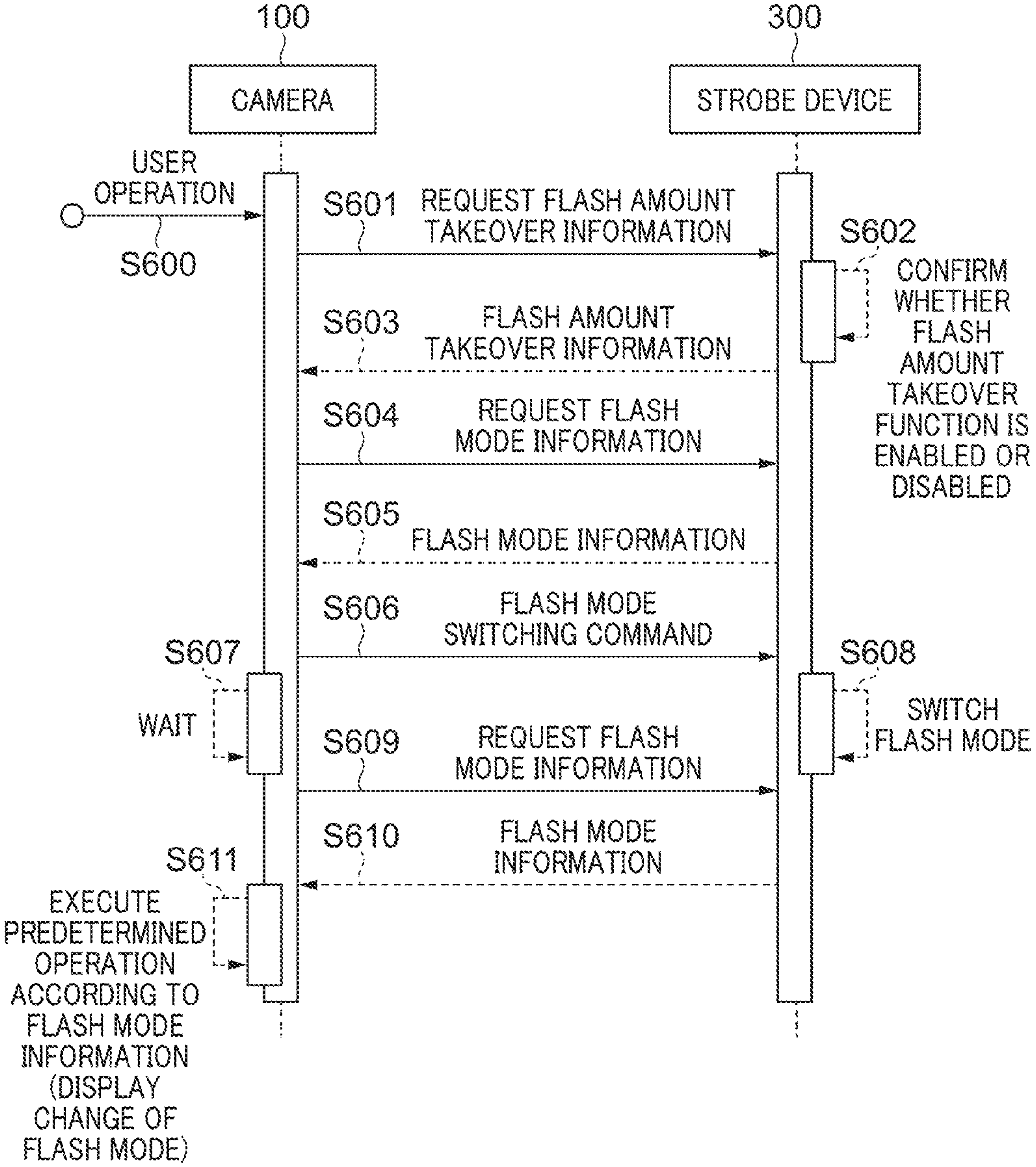
FIG. 6 is a sequence diagram of a processing for switching between an automatic light control mode and a manual flash mode performed by the image pickup apparatus.

Next, switching between the automatic light control mode and the manual flash mode by the pressing operation of the assignment button will be described. FIG. 6 is a sequence diagram of a processing for switching between the automatic light control mode and the manual flash mode performed by the camera 100. When the assignment button is pressed by a user operation in S600, processing in the camera 100 starts.

In S601, the system control unit 101 requests the strobe control unit 301 to provide flash amount takeover information. The flash amount takeover information is information indicating whether the flash amount takeover function of the strobe device 300 is enabled or disabled.

In S602, the strobe control unit 301 receives the request in S601 and confirms whether the flash amount takeover function is enabled or disabled.

In S603, the strobe control unit 301 transmits, to the system control unit 101, the flash amount takeover information indicating whether the flash amount takeover function is enabled or disabled.

In S604, the system control unit 101 requests the strobe control unit 301 to provide flash mode information. The flash mode information is information indicating the flash mode that has been set at that time.

In S605, the strobe control unit 301 receives the request in S604 and transmits, to the system control unit 101, the flash mode information indicating the flash mode that has been set at that time.

In S606, the system control unit 101 transmits a flash mode switching command to the strobe control unit 301. The flash mode switching command does not designate a specific flash mode, but is simply a command to switch the flash mode between the automatic light control mode and the manual flash mode. The flash mode switching command is transmitted to the strobe control unit 301 regardless of the flash mode that has been set in the strobe device 300.

In S607, the system control unit 101 waits for a predetermined time to elapse until the switching of the flash mode in the strobe device 300 is completed.

At the same time as S607, in S608, the strobe control unit 301 switches the flash mode that has been set (the set flash mode) in accordance with the flash mode switching command.

Figure 7:
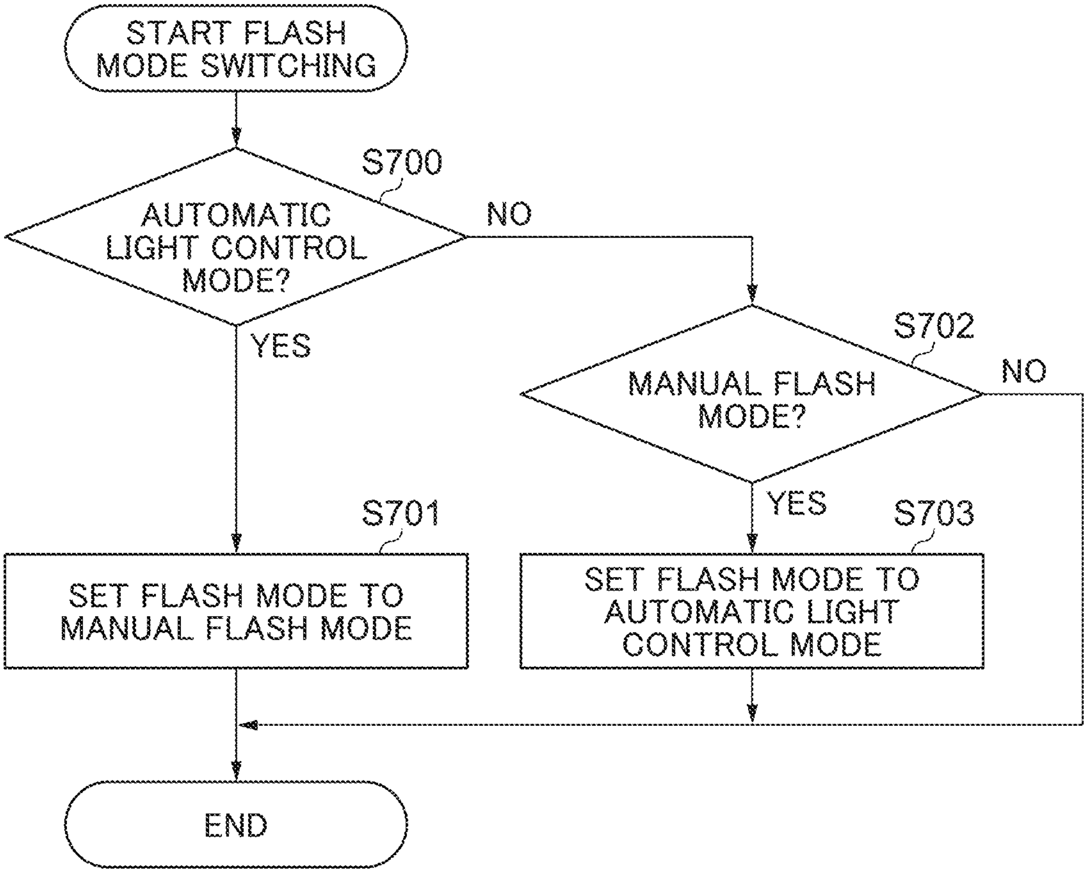
FIG. 7 is a flowchart of a flash mode switching operation executed in S608.

Here, a flash mode switching operation executed by the strobe device 300 in S608 will be described. FIG. 7 is a flowchart of the flash mode switching operation executed in S608.

In S700, the strobe control unit 301 determines whether or not the set flash mode is the automatic light control mode. In the case that the strobe control unit 301 determines that the set flash mode is the automatic light control mode (the flash mode has been set to the automatic light control mode (YES in S700), the strobe control unit 301 executes the process of S701. On the other hand, in the case that the strobe control unit 301 determines that the set flash mode is not the automatic light control mode (the flash mode has not been set to the automatic light control mode (NO in S700), the strobe control unit 301 executes the process of S702.

In S701, the strobe control unit 301 sets the flash mode to the manual flash mode (switches from the automatic light control mode to the manual flash mode), and then ends the flash mode switching operation. At this time, in the case that the flash amount takeover function is disabled in the strobe device 300, the flash amount in the manual flash mode is set to a preset flash amount or the previous flash amount (the most recent flash amount) in the manual flash mode. The preset flash amount is a flash amount that has been set in advance by the user when using the manual flash mode, and may be a flash amount that has been set when the strobe device 300 is shipped.

In S702, the strobe control unit 301 determines whether or not the set flash mode is the manual flash mode. In the case that the strobe control unit 301 determines that the set flash mode is the manual flash mode (the flash mode has been set to the manual flash mode (YES in S702), the strobe control unit 301 executes the process of S703. On the other hand, in the case that the strobe control unit 301 determines that the set flash mode is not the manual flash mode (the flash mode has not been set to the manual flash mode (NO in S702), the strobe control unit 301 ends the flash mode switching operation.

In S703, the strobe control unit 301 sets the flash mode to the automatic light control mode (switches from the manual flash mode to the automatic light control mode), and then ends the flash mode switching operation.

It should be noted that the processes of S700 to S703 are executed regardless of whether the flash amount takeover function is enabled or disabled. In addition, for example, in the case that the flash mode has been set to the multiple flash mode in the strobe device 300, the determinations in S700 and S702 are both "NO", the switching of the flash mode is not performed, and the setting of the multiple flash mode is maintained.

Returning to the description of the sequence diagram of FIG. 6. After waiting for the predetermined time to elapse in S607, in S609, the system control unit 101 requests the strobe control unit 301 to provide flash mode information. The process of S609 is the same as the process of S604.

In S610, the strobe control unit 301 receives the request in S609 and transmits, to the system control unit 101, the flash mode information indicating the flash mode that has been set at that time. The process of S610 is the same as the process of S605.

In S611, the system control unit 101 executes a predetermined operation, such as changing the display content on the camera display unit 106 (for example, display change of the flash mode that has been set at that time), in accordance with the flash mode information received from the strobe control unit 301.

As described above, according to the present embodiment, by one pressing operation of the assignment button on the camera 100, it is possible to alternately switch the flash mode between the automatic light control mode and the manual flash mode, regardless of whether the flash amount takeover function in the strobe device 300 is enabled or disabled. Therefore, since the user generally holds the camera 100 (or the camera 100 and the lens barrel 200) when performing photographing, the user is able to easily perform the switching of the flash mode while looking through a viewfinder.

It should be noted that, in the processing according to the sequence diagram of FIG. 6 and the flowchart of FIG. 7, the flash mode has been switched between the automatic light control mode and the manual flash mode in accordance with the flash mode switching command from the system control unit 101, regardless of whether the flash amount takeover function is enabled or disabled. The disclosure is not limited to this, and the operation of the strobe device 300 when the assignment button is pressed may be the same as the operation when the flash mode switching button provided in the strobe operation unit 303 of the strobe device 300 is pressed.

As a method for realizing such a configuration, for example, the following two methods are given. The first method is a method in which, when the strobe control unit 301 receives the flash mode switching command from the system control unit 101, in the case that the flash amount takeover function is disabled, the strobe control unit 301 performs control not to perform the switching of the flash mode. The second method is a method in which, when the system control unit 101 has detected the pressing operation of the assignment button, in the case that the flash amount takeover information in S603 indicates that the flash amount takeover function is disabled, control that does not send the flash mode switching command is performed. In this case, a warning indicating that the pressing operation of the assignment button is disabled may be displayed on the camera display unit 106.

The user generally holds the camera 100 (or the lens barrel 200 at the same time) when performing photographing. Therefore, in this modification, the user does not need to reach for the flash mode switching button provided in the strobe operation unit 303, but can obtain the same effect as pressing the flash mode switching button by pressing the assignment button while holding the camera 100 facing the subject.

The setting of the switching of the flash mode in the strobe device 300 by the pressing operation of the assignment button to any of the above-described aspects may be made from a menu screen for performing various kinds of settings of the camera 100. As a result, the user is able to handle (operate) the image pickup system 1000 in a manner that suits his/her preference.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-010126, filed on Jan. 26, 2024, which is hereby incorporated by reference herein in its entirety.

What is claimed is:

1. A lighting apparatus comprising:

a light emitting unit;

at least one processor; and a memory coupled to the processor storing instructions that, when executed by the processor, cause the processor to function as:

a communication unit that performs communication with an image pickup apparatus;

a first setting unit that sets a flash mode of the light emitting unit to a first flash mode that causes the light emitting unit to emit light with a flash amount set manually or a second flash mode that causes the light emitting unit to emit light with a flash amount determined by automatic light control;

a control unit that, in a case of receiving a command to switch the flash mode of the light emitting unit from the image pickup apparatus via the communication unit, at a time point of receiving the command, performs switching to the second flash mode when the first flash mode has been set and performs switching to the first flash mode when the second flash mode has been set; and a second setting unit that sets a flash amount takeover function which, when switching from the second flash mode to the first flash mode, sets a most recent flash amount in the second flash mode to an initial flash amount in the first flash mode, to be enabled or disabled, wherein when performing switching from the second flash mode to the first flash mode based on the command from the image pickup apparatus, in a case that the flash amount takeover function is enabled, the control unit sets the most recent flash amount in the second flash mode to the initial flash amount in the first flash mode.

2. The lighting apparatus according to claim 1, further comprising:

an operation member for switching the flash mode of the light emitting unit between the first flash mode and the second flash mode by one operation, and wherein, only in a case that the flash amount takeover function has been set to be enabled, when the operation member has been operated, the control unit performs switching between the first flash mode and the second flash mode.

3. The lighting apparatus according to claim 1, wherein the first setting unit is capable of setting the flash mode of the light emitting unit to a third flash mode different from the first flash mode and the second flash mode, and in a case of receiving the command from the image pickup apparatus in a state where the third flash mode has been set, the control unit does not perform switching of the flash mode of the light emitting unit.

4. An image pickup system, in which a lighting apparatus and an image pickup apparatus are communicably connected to each other, wherein the image pickup apparatus comprises at least one processor; and a memory coupled to the processor storing instructions that, when executed by the processor, cause the processor to function as a generating unit that generates a command to switch a flash mode of the lighting apparatus in response to one operation, and the lighting apparatus comprises a light emitting unit;

at least one processor; and a memory coupled to the processor storing instructions that, when executed by the processor, cause the processor to function as:

a first setting unit that sets the flash mode of the lighting apparatus to a first flash mode that causes the light emitting unit to emit light with a flash amount set manually or a second flash mode that causes the light emitting unit to emit light with a flash amount determined by automatic light control;

a first control unit that, in a case of receiving the command from the image pickup apparatus by communication, at a time point of receiving the command, performs switching to the second flash mode when the first flash mode has been set and performs switching to the first flash mode when the second flash mode has been set, and a second setting unit that sets a flash amount takeover function which, when switching from the second flash mode to the first flash mode, sets a most recent flash amount in the second flash mode to an initial flash amount in the first flash mode, to be enabled or disabled, wherein when performing switching from the second flash mode to the first flash mode based on the command from the image pickup apparatus, in a case that the flash amount takeover function has been set to be enabled, the first control unit sets the most recent flash amount in the second flash mode to the initial flash amount in the first flash mode.

5. The image pickup system according to claim 4, wherein in the lighting apparatus, the first setting unit is capable of setting the flash mode of the lighting apparatus to a third flash mode different from the first flash mode and the second flash mode, and in a case of receiving the command from the image pickup apparatus in a state where the third flash mode has been set, the first control unit does not perform switching of the flash mode of the lighting apparatus.

6. The image pickup system according to claim 4, wherein in the lighting apparatus, the processor is caused to further function as a notifying unit that notifies the image pickup apparatus of first information indicating whether the flash amount takeover function is enabled or disabled by communication, and in the image pickup apparatus, the processor is caused to further function as:

an obtaining unit that obtains the first information by communication; and a second control unit that transmits the command to the lighting apparatus by communication when the command is generated, regardless of whether the first information indicates whether the flash amount takeover function is enabled or disabled.

7. The image pickup system according to claim 4, wherein in the lighting apparatus, the processor is caused to further function as a notifying unit that notifies the image pickup apparatus of first information indicating whether the flash amount takeover function is enabled or disabled by communication, and in the image pickup apparatus, the processor is caused to further function as:

an obtaining unit that obtains the first information by communication; and a second control unit that, when the command is generated, transmits the command to the lighting apparatus by communication in a case that the first information indicates that the flash amount takeover function is enabled and does not transmit the command to the lighting apparatus in a case that the first information indicates that the flash amount takeover function is disabled.

8. The image pickup system according to claim 4, wherein the first setting unit of the lighting apparatus is capable of setting the flash mode of the lighting apparatus to a third flash mode different from the first flash mode and the second flash mode, in the lighting apparatus, the processor is caused to further function as a notifying unit that notifies the image pickup apparatus of second information indicating a flash mode that has been set in the lighting apparatus by communication, and in the image pickup apparatus, the processor is caused to further function as:

an obtaining unit that obtains the second information by communication; and a second control unit that, when the command is generated, does not transmit the command to the lighting apparatus when the second information indicates that the flash mode of the lighting apparatus has been set to the third flash mode.

9. The image pickup system according to claim 4, wherein the lighting apparatus further comprises a second operation member for switching the flash mode of the lighting apparatus between the first flash mode and the second flash mode by one operation, and only in a case that the flash amount takeover function has been set to be enabled, when the second operation member has been operated, the first control unit of the lighting apparatus performs switching between the first flash mode and the second flash mode.

10. A control method for a lighting apparatus that comprises a light emitting unit, the control method comprising:

establishing communication with an image pickup apparatus;

setting a flash mode of the light emitting unit to a first flash mode that causes the light emitting unit to emit light with a flash amount set manually, a second flash mode that causes the light emitting unit to emit light with a flash amount determined by automatic light control, or a third flash mode different from the first flash mode and the second flash mode;

in a case of receiving a command to switch the flash mode of the light emitting unit from the image pickup apparatus, switching the flash mode of the light emitting unit, and setting a flash amount takeover function, which sets a most recent flash amount, with which the light emitting unit has been caused to emit light in the second flash mode, to a flash amount in the first flash mode, to be enabled or disabled, wherein switching the flash mode of the light emitting unit includes, at a time point of receiving the command, switching to the second flash mode when the first flash mode has been set, switching to the first flash mode when the second flash mode has been set, and not switching the flash mode of the light emitting unit in a case that the third flash mode has been set, and wherein when switching the second flash mode to the first flash mode, in a case that the flash amount takeover function has been set to be enabled, the most recent flash amount in the second flash mode is set to an initial flash amount in the first flash mode.

11. A non-transitory computer-readable storage medium storing a program for causing a computer to execute a control method for a lighting apparatus that comprises a light emitting unit, the control method comprising:

establishing communication with an image pickup apparatus;

setting a flash mode of the light emitting unit to a first flash mode that causes the light emitting unit to emit light with a flash amount set manually, a second flash mode that causes the light emitting unit to emit light with a flash amount determined by automatic light control, or a third flash mode different from the first flash mode and the second flash mode;

in a case of receiving a command to switch the flash mode of the light emitting unit from the image pickup apparatus, switching the flash mode of the light emitting unit, and setting a flash amount takeover function, which sets a most recent flash amount, with which the light emitting unit has been caused to emit light in the second flash mode, to a flash amount in the first flash mode, to be enabled or disabled, wherein switching the flash mode of the light emitting unit includes, at a time point of receiving the command, switching to the second flash mode is performed when the first flash mode has been set, switching to the first flash mode is performed when the second flash mode has been set, and switching of the flash mode of the light emitting unit is not performed in a case that the third flash mode has been set, and wherein when switching the second flash mode to the first flash mode, in a case that the flash amount takeover function has been set to be enabled, the most recent flash amount in the second flash mode is set to an initial flash amount in the first flash mode.

* * * * *